United States Patent [19]

Peronnet et al.

[11] Patent Number: 4,952,173
[45] Date of Patent: Aug. 28, 1990

[54] CIRCUIT PROTECTION DEVICE

[75] Inventors: Guillaume M. G. Peronnet, Mountain View, Calif.; Jean-Christian C. Delamotte, Henonville, France

[73] Assignee: Raychem Pontoise, France

[21] Appl. No.: 418,773

[22] Filed: Oct. 2, 1989

Related U.S. Application Data

[63] Continuation of Ser. No. 300,768, Jan. 23, 1989, abandoned, which is a continuation of Ser. No. 92,808, Sep. 3, 1987, abandoned.

[30] Foreign Application Priority Data

Sep. 5, 1986 [GB] United Kingdom ............... 8621429

[51] Int. Cl.$^5$ ............................................ H01R 17/18
[52] U.S. Cl. .................................... 439/583; 439/654; 439/620; 439/935
[58] Field of Search ................. 439/181, 183, 186, 98, 439/99, 578–585, 620, 609, 610; 361/56, 54, 119, 120; 333/12, 13, 17 L, 206, 207, 260, 181–185

[56] References Cited

U.S. PATENT DOCUMENTS

| | | | |
|---|---|---|---|
| 3,711,794 | 1/1973 | Tasca et al. | 361/56 |
| 3,980,976 | 9/1976 | Tadama et al. | 439/181 |
| 4,575,691 | 3/1986 | Capek et al. | 361/56 |
| 4,633,359 | 12/1986 | Mickelson et al. | 361/119 |
| 4,646,037 | 2/1987 | Turolla et al. | 333/12 |
| 4,860,155 | 8/1989 | Wright | 361/56 |

FOREIGN PATENT DOCUMENTS 86302326 10/1986 European Pat. Off. .............. 361/56

OTHER PUBLICATIONS

U.S. patent application Ser. No. 159,473 filed Mar. 3, 1988.
U.S. patent application Ser. No. 945,640 filed Dec. 23, 1986.

Primary Examiner—David L. Pirlot
Attorney, Agent, or Firm—Herbert G. Burkard; Bernard J. Lyons

[57] ABSTRACT

A circuit protection device that can be incorporated into a coaxial cable connector for protecting the circuit from a voltage transient, comprises an annulus 11 that has a central aperture for receiving a central conductor, e.g. pin, of the connector. The annulus is electrically insulating and has a central electrode (12) for connection to the connector pin and a peripheral electrode (14) for connection to the connector housing and the coaxial cable screen. A portion of the electrodes overlie each other and are separated from each other by a layer of semiconductor switching material (16). For example, a chalcogenide glass switching material (16) may be evaporated onto a small projecting area (15) of the central electrode, followed by a small circular area (17) of copper, and the deposited copper area (17) may be wire bonded to the rest of the peripheral electrode (14) by wire bridge (18). In use, the switching material (16) will immediately change to a low resistance state when the coaxial cable is subjected to a voltage transient in order to protect the circuit, and will then revert to its high resistance state.

15 Claims, 5 Drawing Sheets

CIRCUIT PROTECTION DEVICE

This application is a continuation of application Ser. No. 300,768, filed Jan. 23, 1989 now abandoned, which is a continuation of application Ser. No. 092,808, filed Sept. 3, 1987 now abandoned.

This invention relates to the protection of electrical circuits from voltage transients, and especially to devices for protecting coaxial cable lines from such transients.

Electrical transients in electrical lines may be caused in a number of ways, for example by electrostatic discharge, lightning or electromagnetic pulse.

Electrostatic discharges can induce very high currents and voltages on cables and structures such as aeroplanes and ships, wich can penetrate the electrical systems and damage them, either causing hardware damage such as semiconductor burnout, or electronic upset, e.g. transmission loss or loss of stored data. As semiconductor technology advances, the energy needed to cause such damage becomes less.

Electrostatic discharges are extremely fast discharges from a capacitor such as a human body. These discharges, because they can be so local, present an extreme threat to the individual electronic component. The magnitude of the threat is illustrated by reference to IEC Technical Committee TC65, WG4 draft specification or the SAE-AE-4 proposed specification on ESD. In these documents the maximum threat is a double exponential pulse of rise time 5 nanoseconds with a 30 nanosecond fall time. The peak voltage is given as 15,000 volts with a current of 70 amps. The energy storage capacitance is given as 150 pico farads giving a maximum energy of 33 millijoules.

Induced electrical transients caused by lightning represent a threat to electrical/electronic equipment especially in aerospace vehicles. The characteristics of the induced pulses are best described in the SAE AE4L Committee Report AE4L-81-22. Test Wave Forms and Techniques for Assessing the Effects of Lightning-Induced Transients. This specification describes the idealised versions of the lightning stroke waveform and of those which occur when equipment cables are excited by the EM environment produced. The specification specified a range of transients which may be produced during normal operation. The waveforms expected on each line depends on a number of factors but the two basic types are (waveform 3) with a frequency of between 1 and 10 MHz, a rise time of 45 nanoseconds and a peak current of 24 amps. The alternative wave form (Wave Form 4A) is a decaying exponential with a rise time of 100 nanoseconds and a width of 2 microseconds with a peak voltage of 300 volts and peak current of 60 amps.

The most severe threat to electrical and electronic equipment is the electromagnetic pulse although all effects can generate large voltage or current spikes with very short rise times. The exact characteristics of the pulse are complicated although a typical pulse will exhibit a field strength of about $10^5$ Vm$^{-1}$ with an accompanying H field intensity of 130 Am$^{-1}$ (based on free space impedance of 377 ohms), a pulse width of a few microseconds and a rise time of a few nanoseconds. In general damaging amplitudes in the pulse occur within the frequency range of 10 KHz to 100 MHz.

In order to protect electrical circuits from such threats it would be desirable to incorporate therein a circuit protection device which, in normal operation, has a high resistance but which, when the circuit is subjected to a voltage surge, quickly changes to a low resistance state in order to short the current surge to earth, and, after the current surface has finished, immediately reverts to its high resistance state. Based on the electrical characteristics of the pulse and the nature of the equipment it is intended to protect, it is possible to determine what characteristics of a circuit protection device are necessary for it to be able successfully to protect the circuit against the pulse damage. For example, one set of guidelines published by H. R. Philipp and L. M. Levinson in J. Appl Phys 52(2) Feb. 1981 pp. 1083 to 1090, the disclosure of which is incorporated herein by reference, specifies inter alia the following requirements for a surge arrestor material that is intended to short a voltage transient to earth:

Threshold voltage 100 V
Switching delay time <1 nanosecond
Current capacity up to 400 A
Insertion loss <0.4 dB at 0 to 200 MHz <0.8 dB at 200 to 500 MHz.

A number of semiconductor materials that can be used to form circuit protection devices and a number of electrical connectors that employ such materials are disclosed in our copending European Patent Application No. 86302325.5 (Ser. No. 0196891). However no arrangement for incorporating such a material in a coaxial cable connector has been disclosed that is reliable, relatively inexpensive, and is capable of automated production methods.

According to one aspect, the present invention provides a circuit protection device which is suitable for incorporation within a coaxial cable connector to protect an electrical ciruct associated therewith from a voltage transient, the device comprising an annulus that is arranged to be held within the connector and has a central aperture for receiving a central conductive element of the connector, the annulus being formed from an electrically insulating material and having a central electrode in the region of the aperture for electrical connection with the central conductive element of the connector, the annulus also having a peripheral electrode for electrical connection with a portion of the connector that is connected to, or arranged to be connected to, the coaxial cable screen, a portion of the central and peripheral electrode overlying one another and being separated from each other by a layer of a semiconductor switching material that will isolate the two electrodes in normal operation but will become electrically conductive when subjected to a voltage transient and thereby form a short circuit between the central and peripheral electrodes.

Preferably the central electrode is located on the interior surface of the central aperture and on part of a side surface of the annulus. The peripheral electrode may be located around the periphery of a side surface of the annulus and, in addition, on part of the radially outwardly directed surface of the annulus, although in some instances it may be appropriate not to locate any of the peripheral electrode on the outwardly directed surface. Designs in which the peripheral electrode is absent from the radially outwardly directed surface or is present over only a part of the surface allow the electrodes to be formed simultaneously on a large number of annuli before the individual annuli are cut out from a board.

For connectors that are intended for use at low to medium frequencies, e.g. up to about 1 MHz, the electrode design may be such that the peripheral electrode overlaps the outer portion of the central electrode over 360° C. However different designs are preferred for use with connectors that are intended for use at higher frequencies in order to reduce the impedance mismatch.

For coaxial connectors the normal method used to specify the impedance matching in the transmission line is to use the voltage standing wave ratio (VSWR) which is defined as the ratio of the magnitude of the transverse electric field in a plane of maximum strength to the magnitude at the equivalent point in an adjacent plane of minimum field strength. This term is a very convenient means of measuring and comparing the impedance mismatch caused by a device or termination introduced in a cable. High values of VSWR can cause excessive attenuation or power loss, voltage breakdown, thermal degradation, and errors in transmitted signal.

The optimum value for VSWR is unity. Typical specifications such as MIL-C-39012 give test procedures and typical specification values are VSWR 1.3 up to 11 GHz for a TNC connector.

In order to reduce the VSWR, the major part of the side of the annulus, when viewed axially, has no electrode, and preferably not more than 30% of the side surface is covered by an electrode. In addition or alternatively, the electrodes may be designed so that they are both substantially circular as viewed along the axis of the annulus but each has a projecting portion that projects radially toward the other electrode so that the two projecting portions overlap. In this case the inner radius of the peripheral electrode and the maximum radius of the central electrode can be so chosen to reduce the VSWR, e.g. by having a similar ratio to that of the screen and central conductor of the coaxial cable, and the area of overlap of the projecting portions can be reduced, preferably to not more than 25% and especially to not more than 10% of the side surface of the annulus. This form of device is preferably formed by forming one electrode, preferably the central electrode, on the annulus, depositing a layer of the switching material on the projecting portion of the electrode, and then depositing a portion of the other electrode on the switching material by a vapour deposition method. The deposited portion of the electrode may then be connected to the remainder of the electrode by means of a wire bridge.

The switching material is preferably a "fold-back" switching material, that is to say, when subjected to a voltage transient it begins to switch when a certain voltage, referred to as the threshold voltage, is reached, and then the voltage across the switching material decreases to a fraction of the threshold voltage as the resistance of the switching material reduces. Preferably also the switching material is a threshold switching material, that is to say, the switching material will become electrically conducting when subjected to a voltage transient but will revert to its initial, high resistance, state when the current or voltage is reduced below a predetermined holding value. Most preferably the switching material is based on an amorphous chalcogenide material and especially one comprising selenium, arsenic and germanium.

The compositions from which the switching elements are formed are preferably as described in our copending European Patent referred to above, the disclosure of which is incorporated herein by reference. The preferred compositions as described in the co-pending application preferably comprise:

(a) 15 to 75 atomic % selenium;
(b) 10 to 65 atomic % arsenic; and
(c) 5 to 42 atomic % germanium or, if the composition contains less than 35 atomic % selemium, 5 to 35 atomic % germanium in which the proportions of (a), (b) and (c) (based on the total molar quantity of (a), (b) and (c)) add up to 100%.

Preferably the composition contains not more than 35 atomic % germanium, more preferably not more than 30 atomic % germanium and especially not more than 25 atomic % germanium. Also, the composition preferably contains at least 20 atomic % selenium and especially at least 30 atomic % selenium but preferably not more than 70 atomic % selenium and especially not more than 60 atomic % selenium. The composition preferably contains at least 20 atomic % arsenic and especially at least 25 atomic % arsenic, but preferably not more than 60 atomic % arsenic and especially not more than 55 atomic % arsenic. Thus the composition preferably comprises:

(a) 20 to 70 atomic % selenium;
(b) 20 to 60 atomic % arsenic, and
(c) 5 to 30 atomic % germanium and most preferably comprises:

(a) 30 to 60 atomic % selenium;
(b) 25 to 55 atomic % arsenic; and
(c) 5 to 25 atomic % germanium.

All the proportions of the components (a), (b) and (c) are based on the total molar quantity of (a), (b) and (c) alone and total 100%.

It is possible for quantities e.g. up to 10% or sometimes more, of other materials to be present in the compositions used in the devices according to the invention, for example minor amounts of the elements antimony, bismuth, silicon, tin, lead, halogens and some transition metals provided that the presence of such materials does not deleteriously affect the properties, such as the energy to latch and/or off resistivity, to a significant degree. It is preferred, however, for the compositions to contain substantially no tellurium since the presence of tellurium has been found to reduce the off resistivity of the materials severely, although, in certain circumstances, small quantities of cellurium may be tolerated, e.g., up to 10 atomic %, but preferably less than 5 atomic %.

The switching element is usually formed by a vapour deposition method in which a vapour of the appropriate composition is deposited onto one of the electrodes. The vapour may be generated by heating an appropriate mixture of the components (not necessarily having the same composition as the intended glass) or the separate components may simultaneously be heated. In a number of instances it may be appropriate to incorporate a quantity of indium in the glass material or to include an indium layer between the glass material and electrodes in order to reduce the contact resistance between the electrode and glass, and thereby increase the energy to latch of the device, as described in our copending British Application No. 8607719, the disclosure of which is incorporated herein by reference.

The invention also includes coaxial connectors and electrical circuits that employ devices described above. Thus, according to another aspect, the present invention provides a coaxial cable connector which comprises a central contact element for providing an electrical connection to the central conductor of the coaxial cable, an electrically conductive screen connection portion that extends around the central contact element and is electrically isolated therefrom, and a circuit protection device that will provide a short circuit between the central contact element and the screen connection portion when subjected to a voltage transient, the circuit protection device comprising an annulus that is held within the screen connection portion and has a central aperture for receiving the central contact element, the annulus being formed from an electrically insulating material and having a central electrode connected to the central contact element, the annulus also having a peripheral electrode connected to the screen connection portion, a portion of the central and peripheral electrodes overlying one another and being separated from each other by a layer of semiconductor switching material that will isolate the two electrodes in normal operation but will become electrically conductive when subjected to a voltage transient.

The term "connector" is used throughout this specification to include not only devices for connecting two coaxial cables together, but also devices for introducing coaxial cables to electrical equipment, adaptors that may be introduced between the two parts of a connector and the like.

Several forms of device and connector in accordance with the present invention will now be described by way of example, with reference to the accompanying drawings in which.

Referring to FIGS. 1 to 6 of the accompanying drawings, a circuit protection device 1 is formed by drilling an aperture 2 in a board of polytetrafluoroethylene that has been provided with a 50 micrometre thick layer of copper on one surface, and then masking the board and etching the copper from concentric rings around each aperture to provide a central electrode 3 and an additional ring 4 of copper that will form part of the peripheral electrode. A further layer 3' of copper forming part of the central electrode is provided on the interior surface of the aperture 2 by a standard through-hole plating technique either before or after the etching step.

Figure 1:
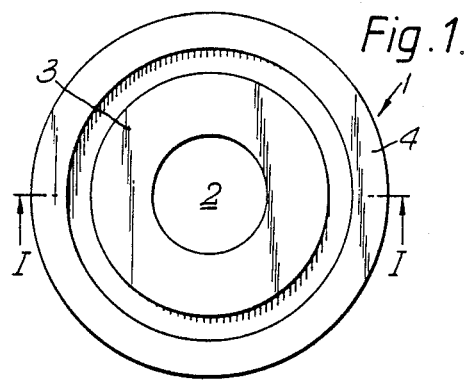
FIG. 1 is an axial view of one side of a device according to the invention during the production thereof.
Figure 2:
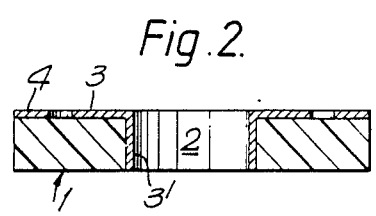
FIG. 2 is a sectional elevation taken along the line I—I of FIG. 1.
Figure 3:
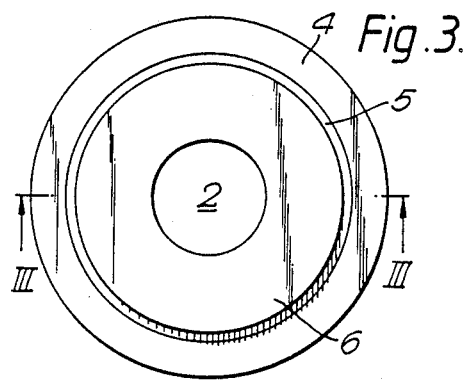
FIG. 3 is an axial view of the device shown in FIG. 1 at a later stage during the production thereof.
Figure 4:
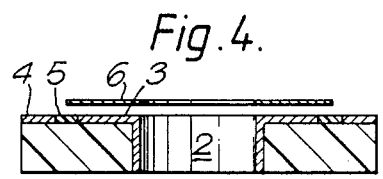
FIG. 4 is a schematic section along the line III—III of FIG. 3 with the thickness of the layers exaggerated for the sake of clarity.
Figure 5:
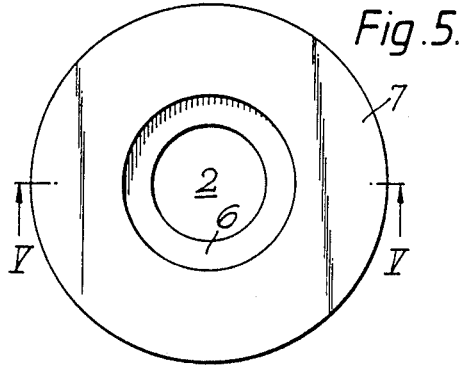
FIG. 5 is an axial view of the device shown in FIG. 1 in its final form.
Figure 6:
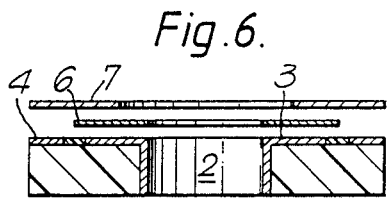
FIG. 6 is a schematic section along the line V—V of FIG. 5.

After formation of the electrode 3 and electrode portion 4, the board is coated with a layer of insulating resin and, after the resin has set, the surface of the board is polished to form a smooth, flat surface in which the electrodes 3 and 4 are exposed and the annular gap between them is filled with resin 5. Then, as shown schematically in FIGS. 3 and 4, a ten micrometre thick layer 6 of a germanium arsenic selenium glass composition is deposited onto the surface of the central electrode 3. As shown in FIGS. 5 and 6, a further annular copper layer 7 is provided, the copper layer 7 providing a part of the peripheral electrode that overlies the glass composition and central electrode 3. Finally the annulus corresponding in extent to that of the peripheral electrode is cut out of the board. The annulus is then ready for insertion into a coaxial cable connector so that the centre conductor of the connector extends through the aperture 2 and the shield connection portion of the connector grips the peripheral electrode.

The form of circu399 effectively on all coaxial cable connectors or adaptors that are used for frequencies of up to 1 MHz.

Although only a single annulus is shown, a large number, e.g. from 10 to 1000 annuli will usually be formed by simultaneous formation of the same elements on a board or plaque of insulating material.

Figure 7:
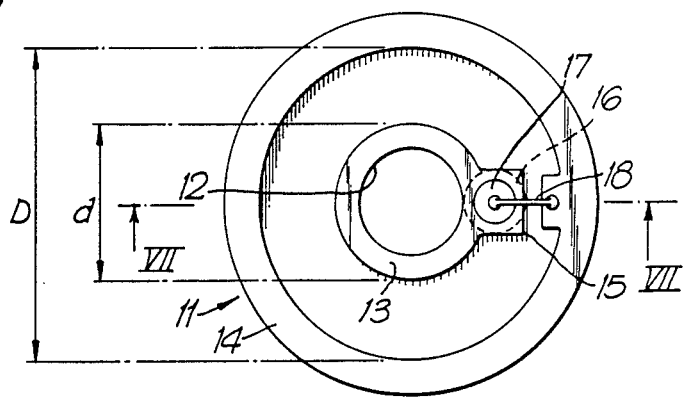
FIG. 7 is an axial view of yet another form of device according to the invention.
Figure 8:
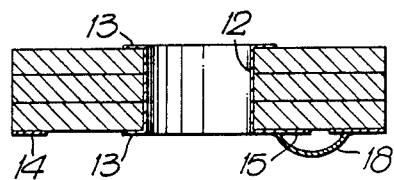
FIG. 8 is a section along the line VII—VII of FIG. 7.

FIGS. 7 and 8 show another form of circuit protection device in accordance with the invention. A polytetrafluoroethylene annulus 11 has a central electrode 12 formed from 50 micrometre thick copper which extends over the internal surface of the central aperture and a small region 13 on either side of the annulus. A peripheral electrode 14 is also provided around the periphery of the annulus. The electrodes are formed by etching from a copper/PTFE laminate and through hole plating as mentioned above. In order to reduce the VSWR of the connector the internal diameter D of the peripheral electrode and the maximum diameter d of the central electrode are arranged to match the characteristic impedance of the coaxial cable.

The central electrode also has a small localised projecting area 15 measuring about 4% of the area of exposed polytetrafluoroethylene dielectric on which a layer of indium, a layer 16 of germanium/arsenic/selenium switching composition and a further layer of indium are deposited by a vapour deposition method. A small circular area 17 about 0.8 mm in diameter of copper is then vapour deposited on the switching composition to form part of the peripheral electrode, and the area 17 is connected to the remainder of the peripheral electrode by means of a wire bridge 18.

Using this form of circuit protection device it is possible to protect connectors that are used at relatively high frequencies without unacceptable VSWR.

Figure 9:
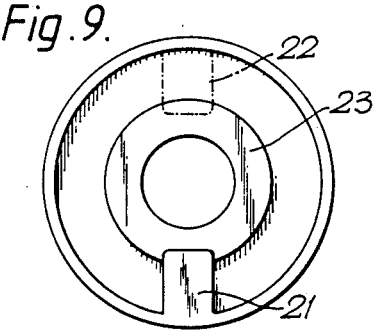
FIGS. 9 and 10 are axial views of other forms of device during their production.
Figure 10:
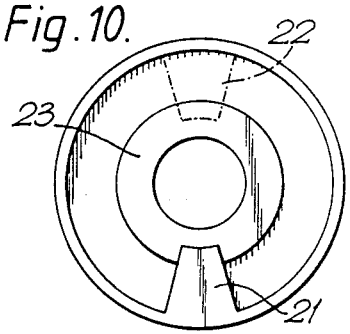

FIGS. 9 and 10 show electrode configurations of two further modifications of the device. In these forms of device a localised area 21 may be provided on the peripheral electrode 20 which overlies part of the central electrode 23 and onto which the switching material (not shown) is deposited. If desired, an additional peripheral electrode and projecting localised area 22 may be provided on the opposite side of the aperture so that a pair of switches are provided in parallel.

The VSWR of a standard BNC connector was compared with that of a BNC connector modified by the provision of this form of circuit protection device, and the results are given in the table.

TABLE

| | VSWR | |
|---|---|---|
| Frequency | Standard Connector | Connector with protection device |
| 10 MHz | 1.0 | 1.0 |
| 100 MHz | 1.0 | 1.2 |
| 1 GHz | 1.0 | 1.1 |
| 4 GHz | 1.1 | 1.3 |
| 11 GHz | 1.3 | 1.3 |

Figure 11:
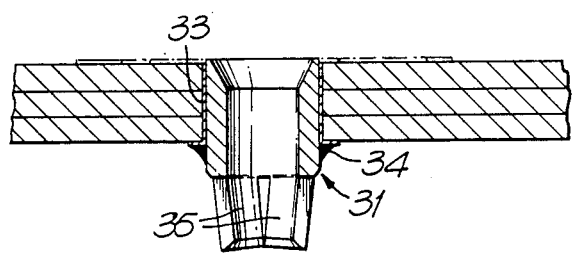
FIG. 11 is a section through part of a modification of a device according to the invention.

FIG. 11 shows part of yet a further modification of the circuit protection device. In this device a collet 31 is inserted into the central aperture of the annulus 32 so that it is in electrical contact with the central electrode 33. The collet is then soldered in place by solder 34. One end of the collet is divided into a plurality of axially extending tines 35 that are radially inwardly biassed for gripping the central conductor of the coaxial cable connector. If desired the opposite end of the collet may be provided with a radially outwardly extending flange which acts as a detent to prevent the collet being pushed out of the aperture.

Figure 12:
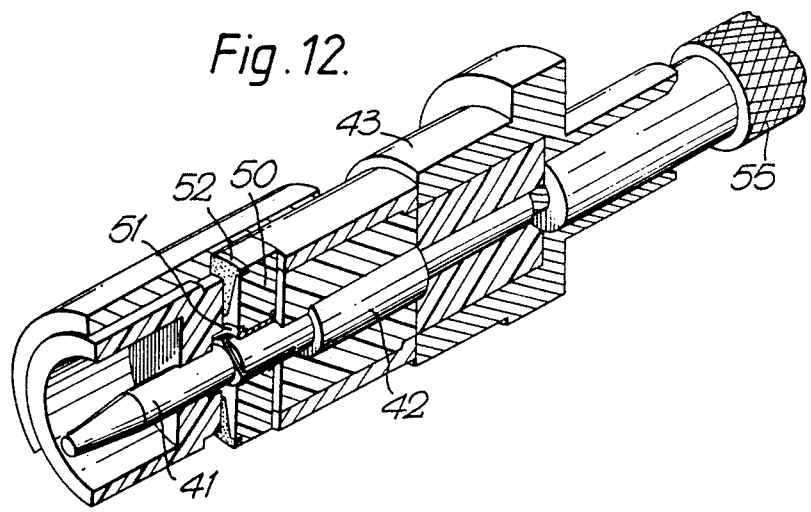
FIG. 12 is a partly cut-away isometric view of a coaxial connector according to the invention.
Figure 13:
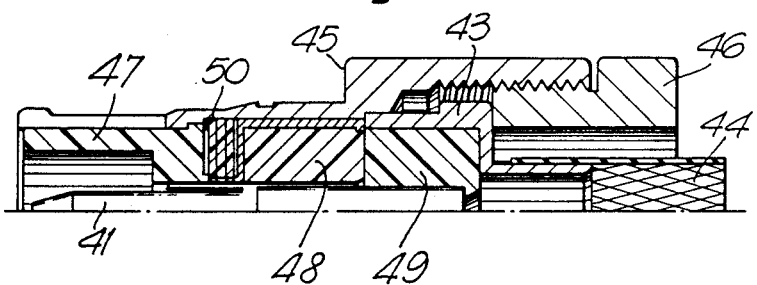
FIG. 13 is a section through part of the connector of FIG. 12.
Figure 14:
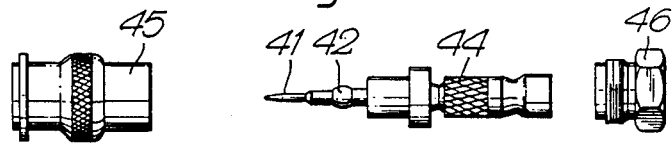
FIG. 14 is an exploded view of a connector assembly employing a connector shown in FIGS. 12 and 13.

FIGS. 12, 13 and 14 show a TNC coax connector which has been protected according to the present invention. The connector has a central conductor 41 which can be connected to the central conductor of a coax cable by means of a solder ring enclosed in a heat-shrinkable polyvinylidine fluoride sleeve 42. The connector has a metallic shield connection portion 43 which can be connected to the coax cable screen 55 by means of a solder impregnated braid 44 enclosed in a further heat shrinkable sleeve. The shield connection portion 43 is clamped between a housing portion 45 that is arranged to couple with another connector, and a back end 46 which, together with the shield connection portion 43, form a generally tubular screen around the central conductor 41. The screen is isolated from the central conductor by means of plastic insulating rings 47, 48 and 49.

An annular circuit protection device 50 is provided inside the housing portion 45 so that the central conductor 41 extends through its central aperture and its periphery is gripped by an internal shoulder 52 in the metallic housing portion 45. The device has a central electrode 51 that extends along the interior surface of the protection device aperture and is in contact with the central conductor 41, and a peripheral electrode 52 which contacts the shoulder 52 of the housing portion. The two electrodes 51 and 52 have an overlapping portion (not shown) that sandwiches a chalcogenide glass switching layer so that, when the connector experiences a voltage transient the glass will become conductive to form a short circuit between the central conductor 41 and the screen.

FIGS. 15 to 18 show further forms of connectors and adaptors that are protected according to the invention.

Figure 15:
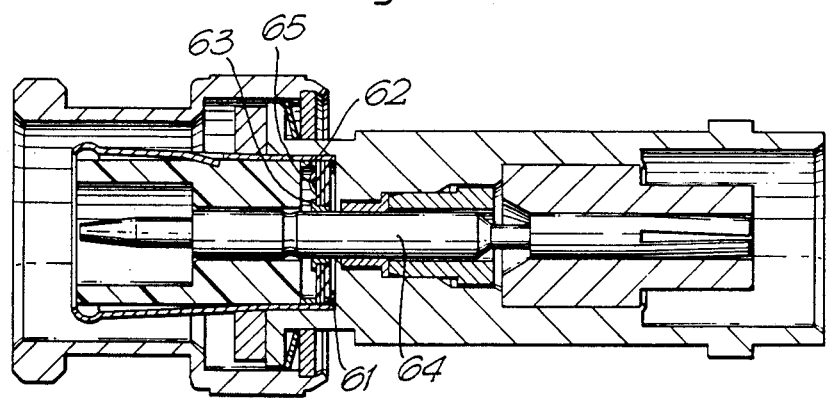
FIGS. 15 to 18 show four further forms of connector according to the invention.

FIG. 15 shows a TNC adaptor for insertion between a male/female connector. The adaptor comprises a circuit protection device 61 which is held in the adaptor housing by a metallic ring 62 that bears on the peripheral electrode of the device 61. The device has a small collet 63 that extends through the central aperture of the device and forms an electrical connection between the central electrode of the device and the central conductor 64 of the adaptor. The device 61 is of the general type shown in FIGS. 7 and 8 in which the different parts of the peripheral electrode are connected by a wire bridge 65.

Figure 16:
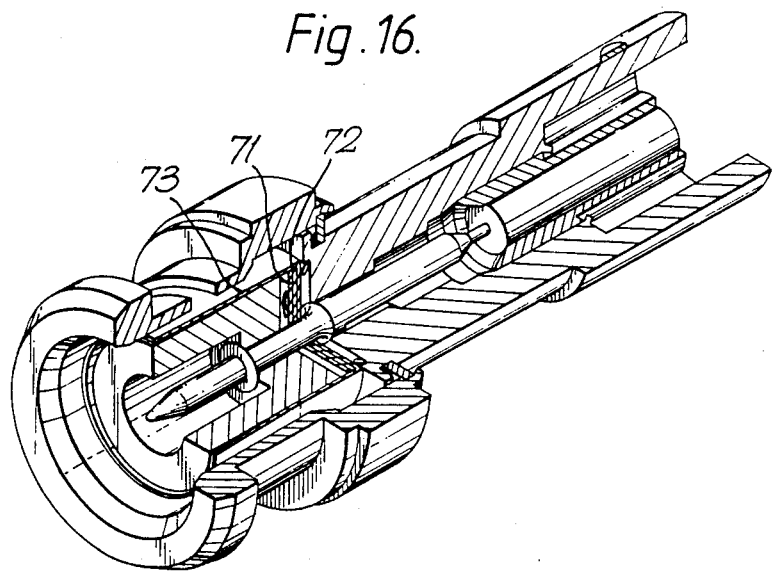
Figure 17:
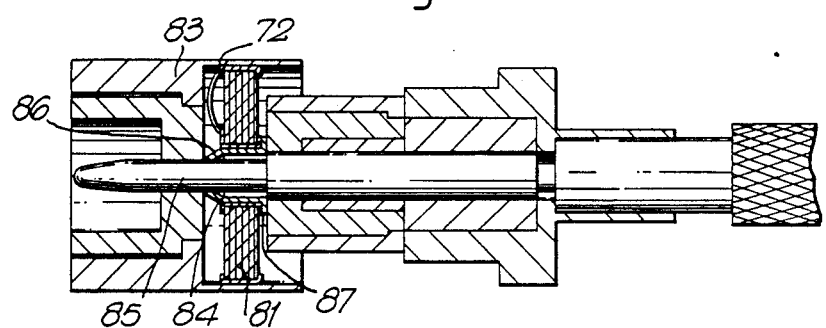
Figure 18:
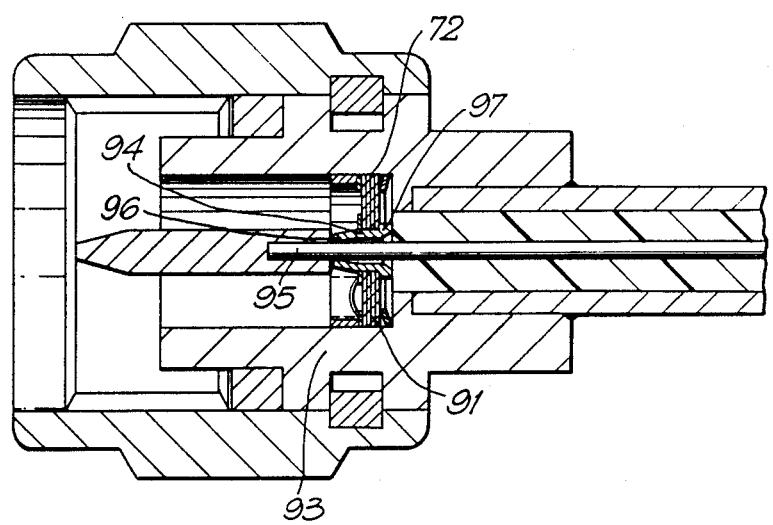

FIG. 16 shows a BNC male to female adaptor that includes a protection device 71; a FIG. 17 shows an SMA connector that includes a protection device 81 and FIG. 18 shows an N type connector that includes a protection device 91.

Each of the protection devices 71, 81 and 91 has a conductive portion 72 that extends over the radially outwardly directed peripheral surface in order to form a connection to the screen portions 73, 83, and 93 of the connector. The conductive portion 72 may be formed by depositing metal over that area during manufacture of the device after the annulus has been cut out from the board, or it may be provided as a metal ferrule that is pushed over the annulus.

In the connectors shown in 17 and 18 a metal collet 84 and 94 is inserted into the central aperture of the device 81 and 91 in order to form an electrical connection to the central conductor 85 and 95 of the connector. The collet has one end 86 and 96 that is divided into a number of radially inwardly biassed tines for gripping the central conductor 85 and 95, and an opposite end that is peened outwardly to form a flange 87 and 97 that ensures correct positioning of the collet within the annulus. Preferably the collet is soldered to the central electrode.

We claim:

1. A circuit protection device, which is suitable for incorporation within a connector for a coaxial cable that includes a screen, to protect an electrical circuit associated with the connector from a voltage transient, the device comprising an annulus, having a radially outwardly directed surface and a side surface, that is arranged to be held within the connector and has a central aperture for receiving a central conductive element of the connector, the annulus:
   (a) being formed from an electrically insulating material; and
   (b) having a central electrode in the region of the aperture for electrical connection with the central conductive element of the connector; and
   (c) also having a peripheral electrode for electrical connection with a portion of the connector that is connected to, or arranged to be connected to, the coaxial cable screen;

wherein a portion of the central electrode overlaps a portion of the peripheral electrode, the area of overlap being not more than 25% of the area of the side surface of the annulus, and the overlapping portion of the electrodes being separated from each other by a layer of a semiconductor foldback switching material that will electrically isolate the two electrodes in normal operation but will become electrically conductive when subjected to a voltage transient and thereby form a short circuit between the central and peripheral electrodes, but revert to its initial, high resistance, state when the current or voltage is reduced below a predetermined holding value.

2. A device as claimed in claim 1, wherein the central electrode is located on the interior surface of the central aperture and on part of a side surface of the annulus.

3. A device as claimed in claim 1, wherein the peripheral electrode is located around the periphery of a side surface of the annulus but not on the radially outwardly directed surface of the annulus.

4. A device as claimed in claim 1, wherein the area of overlap is not more than 10% of the side surface of the annulus.

5. A device as claimed in claim 1, wherein at least part of the electrode that overlies the other has been formed by a vapour deposition process.

6. A device as claimed in claim 1, wherein one of the electrodes has a localised area for supporting the semiconductor switching material and the other electrode has a portion that has been deposited on the switching material by a vapour deposition method.

7. A device as claimed in claim 1, which includes an electrically conductive collet that has been inserted into the central aperture to retain the central conductive element of the connector.

8. A device as claimed in claim 1, wherein the semiconductor switching material is a fold-back switching material.

9. A device as claimed in claim 1, wherein the semiconducor switching material is a threshold switching material.

10. A device as claimed in claim 1, wherein the major part of the side surface of the annulus, when viewed axially, has no electrode.

11. A device as claimed in claim 8, wherein not more than 30% of the side surface of the annulus is covered by an electrode.

12. A device as claimed in claim 1, wherein the semiconductor switching material is based on an amorphous chalcogenide material.

13. A device as claimed in claim 12, wherein the semiconductor switching material is based on germanium, selenium and arsenic.

14. A connector for a coaxial cable which comprises:
 (1) a central contact element for providing an electrical-connection to the central conductor of the coaxial cable;
 (2) an electrically conductive screen connection that extends around the central contact element and is electrically isolated therefrom; and
 (3) a circuit protection device that will provide a short circuit between the central contact element and the screen connection portion when subjected to a voltage transient;
the circuit protection device comprising an annulus, that is held within the screen connection portion and has a central-aperture for receiving the central conductive element, the annulus:
 (a) being formed from an electrically insulating material; and
 (b) having a central electrode connected to the central contact element; and
 (c) also having a peripheral electrode connected to the screen connection portion;
wherein a portion of the central electrode overlaps a portion of the peripheral electrode, the area of overlap being not more than 25% of the area of the side surface of the annulus, and the overlapping portion of the electrodes being separated from each other by a layer of semiconductor material that will electrically isolate the two electrodes in normal operation but will become electrically conductive when subjected to a voltage transient;
the connector having a voltage standing wave ratio between 1 and 1.3 at 11 GHz.

15. A circuit protection device which is suitable for incorporation within a connector for a coaxial cable that includes a screen, to protect an electrical circuit associated with the connector from a voltage transient, the device comprising an annulus, having a radially outwardly directed surface and a side surface, that is arranged to be held within the connector and has a central aperture for receiving a central conductive element of the connector, the annulus:
 (a) being formed from an electrically insulating material; and
 (b) having a central electrode in the region of the aperture for electrical connection with the central conductive element of the connector; and
 (c) also having a peripheral electrode for electrical connection with a portion of the connector that is connected to, or arranged to be connected to, the coaxial cable screen;
wherein a portion of the central electrode overlaps a portion of the peripheral electrode, the area of overlap being not more than 25% of the area of the side surface of the annulus, and the overlapping portion of the electrodes being separated from each other by a layer of a semiconductor foldback switching material that will electrically isolate the two electrodes in normal operation but will become electrically conductive when subjected to a voltage transient and thereby form a short circuit between the central and peripheral electrodes, but revert to its initial, high resistance, state when the current or voltage is reduced below a predetermined holding value, one of the electrodes having a localized area for supporting the semiconductor switching material and the other electrode having a portion that has been deposited on the switching material by a vapor deposition method, the portion of the electrode that has been deposited on the switching material being connected to the remainder of that electrode by a wire, bridge.

* * * * *